United States Patent
Tanaka

(10) Patent No.: US 6,782,397 B2
(45) Date of Patent: Aug. 24, 2004

(54) READABLE INFORMATION PRODUCTION SYSTEM AND DIGITAL CONTENT DELIVERY SYSTEM

(75) Inventor: Toshio Tanaka, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 307 days.

(21) Appl. No.: 09/946,609

(22) Filed: Sep. 6, 2001

(65) Prior Publication Data

US 2002/0040320 A1 Apr. 4, 2002

(30) Foreign Application Priority Data

Sep. 6, 2000 (JP) ............................... 2000-270429

(51) Int. Cl.[7] ........................................... G06F 17/130
(52) U.S. Cl. ............... 707/104.1; 715/506; 715/527
(58) Field of Search ................. 707/104.1; 715/506, 715/527

(56) References Cited

U.S. PATENT DOCUMENTS

| | | | | |
|---|---|---|---|---|
| 5,499,366 A | * | 3/1996 | Rosenberg et al. | 707/4 |
| 5,649,216 A | * | 7/1997 | Sieber | 715/506 |
| 6,101,513 A | * | 8/2000 | Shakib et al. | 715/527 |
| 6,123,362 A | * | 9/2000 | Squilla et al. | 283/67 |
| 6,134,548 A | * | 10/2000 | Gottsman et al. | 707/5 |
| 6,195,689 B1 | * | 2/2001 | Bahlmann | 709/217 |
| 6,611,348 B1 | * | 8/2003 | Chase et al. | 358/1.15 |
| 2001/0034609 A1 | * | 10/2001 | Dovolis | 705/1 |
| 2002/0049792 A1 | * | 4/2002 | Wilcox et al. | 707/522 |
| 2002/0073178 A1 | * | 6/2002 | Jalili | 709/219 |
| 2002/0087510 A1 | * | 7/2002 | Weinberg et al. | 707/1 |

FOREIGN PATENT DOCUMENTS

| | | |
|---|---|---|
| EP | 0 834 822 A2 | 4/1998 |
| JP | A-4-192751 | 7/1992 |
| JP | A-7-200701 | 8/1995 |
| WO | WO 98/08176 | 2/1998 |
| WO | WO 99/33293 | 7/1999 |

OTHER PUBLICATIONS

Alexander von Berg et al., "A Concept for an electronic Magazine", Computer Networks 31 (1999), pp. 2245–2251.

Hidekazu Sakagami et al., "Effective Personalization of Push–Type Systems—Visualizing Information Freshness", Computer Networks and ISDN Systems 30 (1998), pp. 53–63.

David Choy et al., "Services and Architectures for Electronic Publishing", 1996 IEEE Proceedings of COMPCON '96, pp. 291–297.

* cited by examiner

Primary Examiner—Wayne Amsbury
(74) Attorney, Agent, or Firm—Oliff & Berridge, PLC

(57) ABSTRACT

The invention provides a digital content delivery system appropriate for outputting a digital content in an easy-to-view layout to a user. A content delivery terminal includes a user information registration DB that stores a plurality of layout definition files defining output layouts of digital contents. When user information, including a destination address and a selection of an output layout, is input, the input user information is associated with the selected layout definition file before the input user information and the layout definition file are registered in the user information registration DB. Based on the layout definition file in the user information registration DB, the output layout of a digital content is determined, and the digital content is produced. The produced digital content is delivered to a destination address corresponding to the layout definition file used to produce the digital content.

6 Claims, 11 Drawing Sheets

| 302 | 304 | 306 | 308 | 310 | 312 | 314 | 316 | 318 |
|---|---|---|---|---|---|---|---|---|
| USER ID | DESTINATION ADDRESS | CATEGORY NO. | KEYWORD | DATE OF DELIVERY | TIME OF DELIVERY | LAYOUT NO. | MAXIMUM NUMBER OF PAGES | FONT SIZE |
| Andy | Andy@aaa.com | 1700 | PROCESSOR | EVERY DAY | 5 | 2 | 2 | SMALL |
| Bill | Bill@bbb.com | 1501 | OS | WEEKDAY | 11 | 5 | 2 | SMALL |
| Candy | Candy@ccc.com | 201* | APPLICATION | WEEKEND | 9 | 6 | 0 | STANDARD |

300 USER PROFILE TABLE

330 LAYOUT NO. DEFINITION TABLE

| LAYOUT NO. | LAYOUT DEFINITION FILE |
|---|---|
| 1 | form01 |
| 2 | form02 |
| 3 | form03 |
| 4 | form04 |
| 5 | form05 |
| 6 | form06 |

(a)

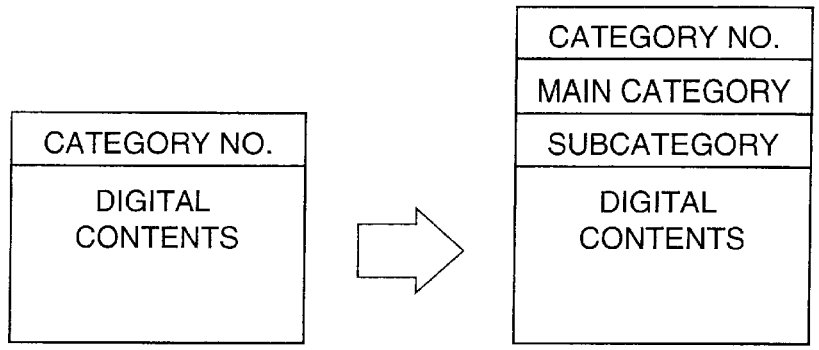

(b)

340 CATEGORY NO. DEFINITION TABLE

| CATEGORY NO. (342) | MAIN CATEGORY (344) | SUBCATEGORY (346) |
|---|---|---|
| 1102 | WORLD NEWS | U.S. |
| 1135 | LOCAL NEWS | TOKYO |
| 1122 | POLITICS | ELECTION |
| 1202 | WEATHER | WORLD TEMPERATURES |
| 1310 | BUSINESS | FINANCIAL AFFAIRS |
| 2010 | SPORTS | BASEBALL |
| 2020 | SPORTS | FOOTBALL |
| 2030 | SPORTS | BASKETBALL |
| 2040 | SPORTS | HOCKEY |
| 2050 | SPORTS | SOCCER |
| 2070 | SPORTS | GOLF |
| 3000 | SPORTS | TENNIS |
| 1121 | HOBBIES | HISTORY |
| 1500 | HEALTH | PREVENTIONS |
| 1401 | ENTERTAINMENTS | TELEVISION |
| 1432 | TRAVEL | TOURISM |
| 1501 | SCIENCE AND TECHNOLOGY | COMPUTER |

FIG. 5

Step 3

DESTINATION ADDRESS

DATE OF DELIVERY

520

530 ○ EVERY DAY
531 ○ EVERY WEEK
532 ○ WEEKDAY (MONDAY-FRIDAY)
533 ○ WEEKEND (SATURDAY, SUNDAY)

TIME OF DELIVERY

540 Select Timezone ▼

541 Select Time of Day ▼

542 ENTER

FIG. 10

READABLE INFORMATION PRODUCTION SYSTEM AND DIGITAL CONTENT DELIVERY SYSTEM

BACKGROUND OF THE INVENTION

1. Field of Invention

The present invention relates to a system for delivering a digital content and, more particularly, to a readable information production system and a digital content delivery system, appropriate for outputting digital contents in an easy-to-view layout to users.

2. Description of Related Art

For example, Japanese Unexamined Patent Application Publication No. 4-192751 discloses an electronic newspaper system intended to be accessed by individuals (hereinafter referred to as "a first conventional art") as a system for providing digital contents, such as news. Further, Japanese Unexamined Patent Application Publication No. 7-200701 discloses a mail-order sale catalog production system (hereinafter referred to as "a second conventional art") as a technique for providing digital contents.

The electronic newspaper system of the first conventional art, which receives news information transmitted from a news information data base that stores news information of newspapers, and displays the news information on a screen in a reorganized form, includes an information storage unit for storing interests and knowledge, owned by a plurality of users, as page layout information intended for a plurality of individuals, a learning unit for learning the page layout information intended for the individuals from the history of searches performed by each user, a screen control unit which controls a screen to acquire the page layout information intended for the individuals, reorganizes newspaper information in accordance with each user from the data base, based on the page layout information intended for the individuals, and displays the reorganized newspaper information, and a management unit for managing the information storage unit, the learning unit, and the screen control unit.

In this arrangement, the newspaper information is easily acquired according to the interest and knowledge of each user, and more detailed newspaper information is thus provided.

The mail-order sale catalog production system of the second conventional art prepares a product information file that includes product information (photographs and illustrations of products, and the description thereof) to be listed in a catalog for each product, a customer information file that includes private information relating to particular attributes of each customer, and a product criterion file that sets, for each product, a criterion which matches each attribute of the private information. A listed product extraction unit compares the private information in the customer information file with the criterion in the product criterion file, and extracts only products that match the criterion of each customer. A layout processing unit reads and lays out production information of extracted products. An electronic color printer prints out the laid-out product information on a sheet of paper. The sheets are book-bound into a booklet, which is then sent to individual customers as a catalog.

A catalog that is unique to each customer and that only has products matching the customer's preference is thus produced.

Most of newspaper information that is delivered by a digital content delivery system typically includes text information like news information delivered in an electronic mail form. This is because a vast amount of data cannot be transmitted within an available time due to a slow rate of data transmission over a network, etc. For this reason, in many cases, it suffices to read newspaper information on a screen, and there is no much need for printing out the newspaper information. Even if the newspaper information is printed out, a user simply reads a text portion, and is not very much concerned with the layout thereof. Since, due to hardware development, the data transmission rate over a network has increased, not only text information but also picture information can also be delivered. When reading the newspaper information on a screen, users experience difficulty to entirely comprehend the entire newspaper information, and thus possibly desire to view the delivered newspaper information on a printed sheet.

In the first conventional art, a WWW browser or the like may be used to read the newspaper information. With the WWW browser, if the newspaper information that is displayed on screen is printed, a single piece of newspaper information may be printed that straddles a plurality of sheets, rather than on a single sheet, and a user may experience difficulty to view printout results. Particularly when a single piece of newspaper information is formed of a picture and text information, the picture may be printed on a sheet different from a sheet on which the text information is printed. In such a case, the user has difficulty in entirely comprehending the correspondence between the text information and the picture. The user is thus unable to understand not only the newspaper information as a whole, but also the contents of individual pieces of information themselves.

In the digital content delivery system of the second conventional art, the above problem is resolved to some degree when the product information of an extracted product is read and laid out. However, the output layout of the catalog is determined by the provider of the catalog. The catalog is printed out in a predetermined output layout which is easy to view. Although the catalog is easy to view on the average, not all users find it to easy to view. Specifically, one user may find the text information that is printed in a large font easy to view, while another user may find it easy to view a catalog in which a layout portion assigned to text information is set to be smaller while a layout portion assigned to a picture is set to be larger.

SUMMARY OF THE INVENTION

The present invention has been developed in view of unresolved problems in the conventional art, and it is an object of the present invention to provide a readable information production system and a digital content delivery system, appropriate for outputting digital contents in a layout that a user finds easy to view.

To achieve the above object, a readable information production system of the present invention for delivering readable information, includes a layout information storage device that stores a plurality of pieces of layout information relating to an output layout of readable information. To produce the readable information, the readable information production system enters user information and a selection of layout information, registers, in the layout information storage device, the input user information and the selected layout information with the user information being associated with the layout information, and determines an output layout of the readable information based on the layout information in the layout information storage device.

When the user information and the selection of the layout information in this arrangement are input, the user information is associated with the layout information and is then registered in the layout information storage device. Based on the layout information in the layout information storage device, the output layout of the readable information is determined and the readable information is thus produced.

The readable information is thus output in an output layout that is relatively close to the user's satisfaction. The readable information is thus output in an output layout in an easy-to-view fashion to the user.

The system may be implemented in a single apparatus, or may be implemented in a network system communicably connected to a plurality of terminals. In the former case, the user information and the selection of the layout information may be input to a single apparatus by a user or a system controller. In the latter case, a user inputs the user information and the selection of the layout information to a server terminal for registration in accordance with the present invention by accessing a client terminal. The same is true of a digital content delivery system in accordance with the claimed invention.

The output layout includes a display layout such that the readable information is displayed on a screen, and a print layout such that the readable information is printed on a sheet of paper.

The produced readable information may be delivered to the users, or may be stored in storage device so that a user gains an access thereto through a client terminal.

A readable information production system in accordance with another aspect of the present invention further includes a readable information storage device that stores a plurality of pieces of readable information. The user information includes information relating to readable information desired by a user. To produce the readable information, the readable information production system reads, from the layout information storage device, the information related to the desired readable information and the layout information corresponding to the information relating to the desired readable information, selects the readable information from the readable information storage device based on the read information relating to the desired readable information, and determines an output layout for the selected readable information based on the read layout information.

In this arrangement, the information relating to the desired readable information and the layout information corresponding to the information relating to the desired readable information are read from the layout information storage device, and the readable information is selected from the readable information storage device based on the read information relating to the desired readable information. Based on the read layout information, the output layout is determined for the selected readable information, and the readable information is thus produced.

Accordingly, only readable information that is relatively close to the user's satisfaction is laid out. This arrangement reduces the difficulty of viewing the information, which would be increased if undesired and unnecessary readable information were laid out together with the desired one in a mixed fashion. The readable information is thus output in an easy-to-view layout to the user.

To achieve the above object, a digital content delivery system of the present invention for delivering a digital content, includes a layout information storage device that stores a plurality of pieces of layout information relating to an output layout of the digital content, an input device that inputs user information containing a destination address of the digital content and a selection of the layout information, a registering device that registers, in the layout information storage device, the user information input by the input device and the layout information selected by the input device with the user information being associated with the layout information, a content production device that produces the digital content by determining the output layout of the digital content based on the layout information in the layout information storage device, and a content delivery device that delivers the digital content which is produced by the content production device in accordance with the destination address responsive to the layout information used to produce the digital content in the content production device.

When the user information and the selection of the layout information are input by the input device in this arrangement, the registering device associates the input user information with the selected layout information. The user information and the layout information are then stored in the layout information storage device. The content production device determines the output layout of the digital content based on the layout information in the layout information storage device, and produces the digital content. The content delivery device delivers the produced digital content in accordance with the destination address corresponding to the layout information used in the production of the digital content.

Since the digital content is output in an output layout that is relatively close to the user's satisfaction in this way, the system outputs the digital content in an easy-to-view output layout to the user.

The output layout includes a display layout according to which the digital content is displayed on a screen, and a print layout according to which the digital content is printed on a recording medium, such as a sheet of paper.

A digital content delivery system in accordance with another aspect of the present invention further includes a content storage device that stores a plurality of digital contents. The user information includes content information relating to a digital content the delivery of which is desired by a user. To produce the digital content, the content production device reads, from the layout information storage device, the content information and the layout information corresponding to the content information, selects the digital content from the content storage device based on the read content information, and determines an output layout for the selected digital content based on the read layout information.

In this arrangement, the content production device reads the content information and the layout information corresponding to the content information from the layout information storage device, and selects the digital content from the content storage device based on the read content information. The content production device determines the output layout for the selected digital content based on the read layout information, and produces the digital content.

Only the digital content that is relatively close to the user's satisfaction is laid out. This arrangement reduces the difficulty of viewing information, which would be increased if undesired and unnecessary readable information were laid out together with the desired information in a mixed fashion. The digital content is thus output in an easy-to-view layout to the user.

In a digital content delivery system in accordance with another aspect of the present invention, the user information contains schedule information relating to a time band in which a user desires delivery, and the content delivery device delivers the digital content produced in the content production device in accordance with the schedule information corresponding to the layout information used to produce the digital content in the content production device.

In this arrangement, the content delivery device delivers the produced digital content in accordance with the schedule information corresponding to the layout information used to produce the digital content in the content production device.

Since the digital content is thus delivered within the time band in which the user desires delivery, the system can provide a delivery service to the user's satisfaction.

The readable information production system and the digital content delivery system in accordance with the invention achieve the above-referenced object. The present invention is not limited to these systems. To achieve the above object, the following storage medium is also covered by the claimed invention.

The storage medium stores a computer readable, content delivery program. The storage medium also stores a layout information storage program for storing a plurality of pieces of layout information relating to an output layout of a digital content, an input program for inputting user information containing a destination address of the digital content and a selection of the layout information, a registering program for registering, in the layout information storage program, the user information input by the input program and the layout information selected by the input program with the user information being associated with the layout information, a content production program for producing the digital content by determining the output layout of the digital content based on the layout information in the layout information storage program, and a content delivery program for delivering the digital content which is produced by the content production program in accordance with the destination address responsive to the layout information used to produce the digital content in the content production program.

In this arrangement, the content delivery program stored in the storage medium is installed in a computer, and when the computer executes the read program, the computer performs the same operation and the same advantages are provided as those provided by the digital content delivery system discussed above.

BRIEF DESCRIPTION OF THE DRAWINGS

FIG. 3 shows a data structure of a user profile table 300;

FIGS. 5(a) and 5(b) show a digital content and a data structure of a category number definition table 340;

FIG. 10 shows a destination address entry screen;

DETAILED DESCRIPTION OF PREFERRED EMBODIMENTS

Figure 1:
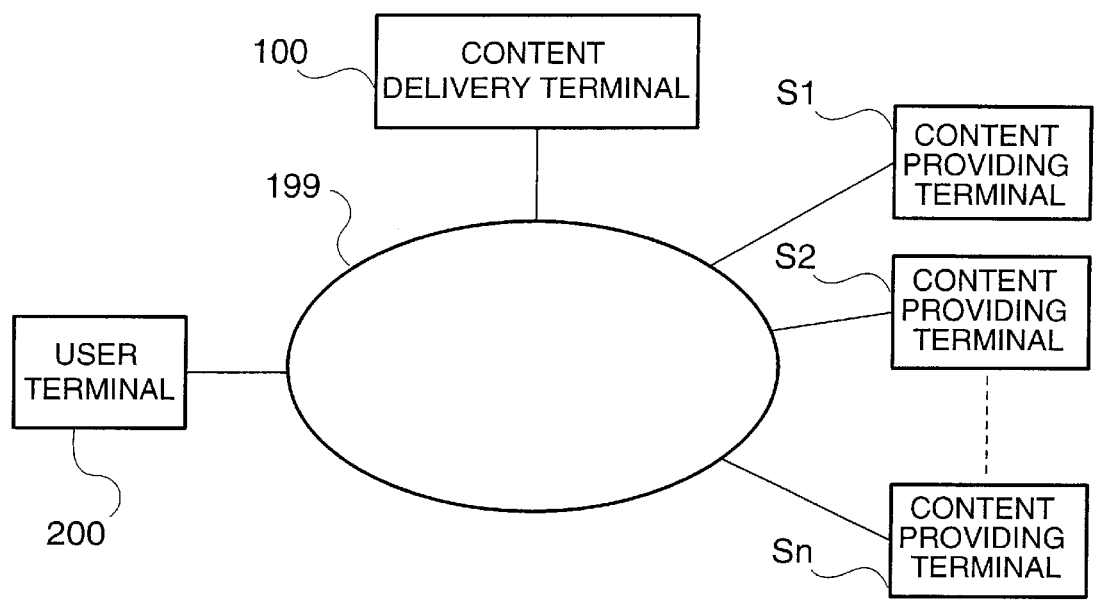
FIG. 1 is a schematic showing the structure of a network system implementing the present invention.

The embodiments of the present invention will now be discussed, referring to the drawings. FIG. 1 through FIG. 12 show one embodiment of a readable information production system and a digital content delivery system of the present invention.

As shown in FIG. 1, a content delivery terminal 100 delivers digital contents, such as news, to a user terminal 200 in the readable information production system and the digital content delivery system of the present invention.

The structure of a network system implementing the present invention will now be discussed, referring to FIG. 1. FIG. 1 is a schematic showing the structure of the network system implementing the present invention.

The following elements are connected to the Internet 199: a plurality of content providing terminals $S_1$–$S_n$, that provide digital contents, the content delivery terminal 100 that collects and delivering digital contents provided by the content providing terminals $S_1$–$S_n$, and the user terminal 200 that provides service to a user as shown in FIG. 1. Although a single user terminal 200 is shown for simplicity, a plurality of user terminals are actually connected to the Internet 199.

Each of the content providing terminals $S_1 S_N$, having the same function of a typically available computer, is formed of a CPU, a ROM, a RAM, and an I/F, all of these elements being interconnected through a bus. When the content providing terminal produces a digital content, the terminal adds a category number to the digital content to identify a category of the digital content, and transmits the digital content to the content delivery terminal 100. The category number will be discussed in more detail below.

The user terminal 200, having the same function of a typically available computer, is formed of a CPU, a ROM, a RAM, and an I/F, all of these elements being interconnected through a bus. The user terminal 200 is also equipped with a WWW browser, and accesses the content delivery terminal 100 using the WWW browser.

Figure 2:
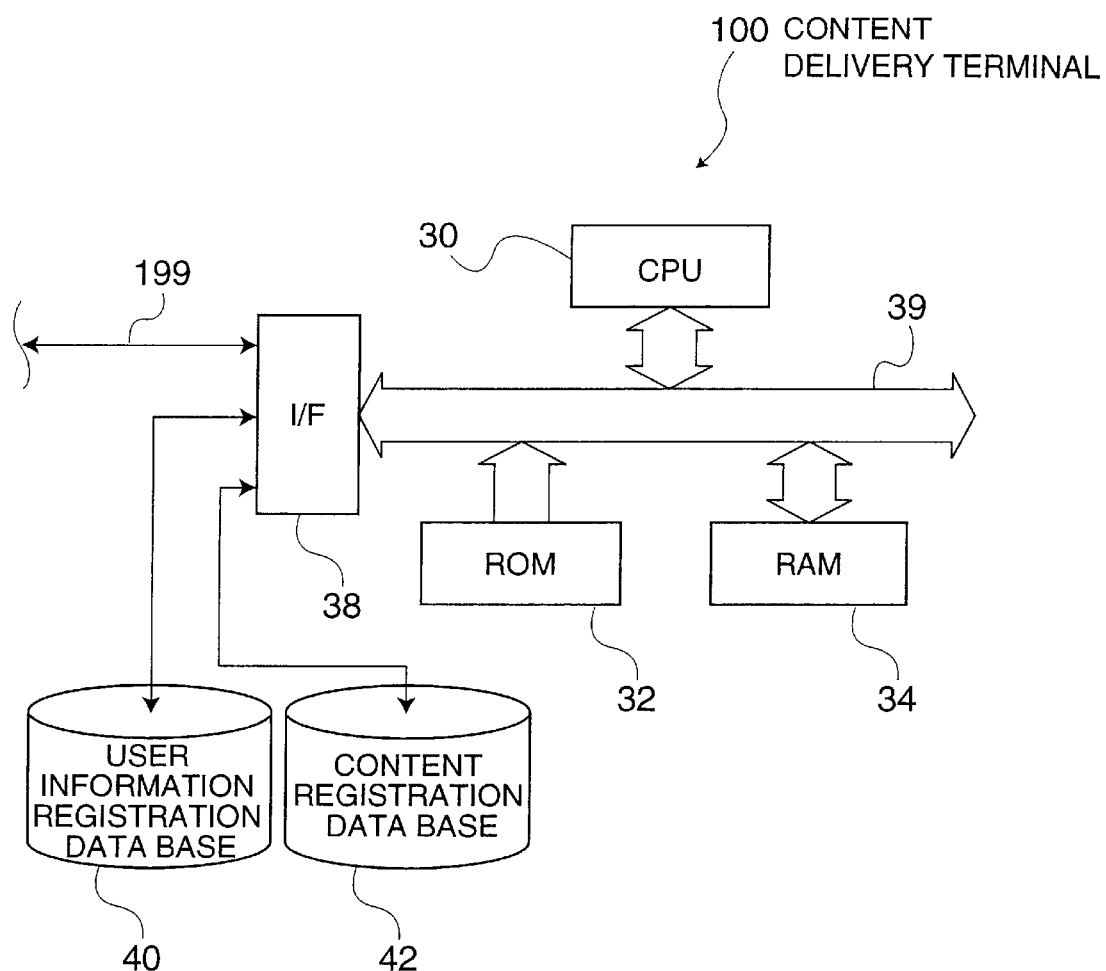
FIG. 2 is a schematic of a content delivery terminal 100.
Figure 4:
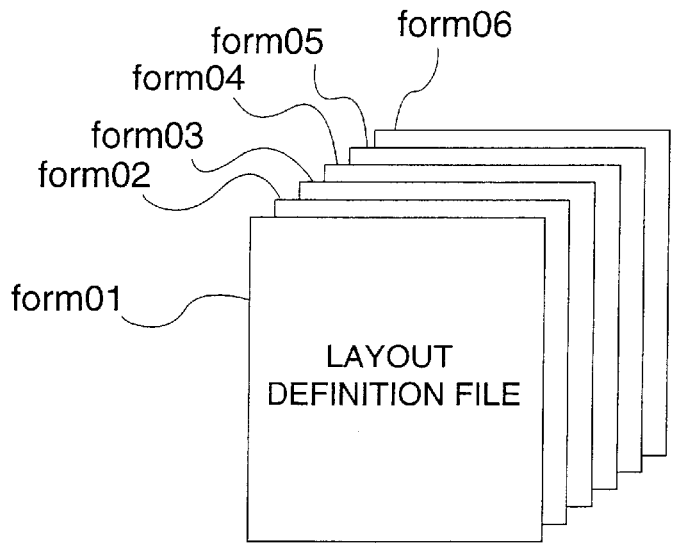
FIGS. 4(a) and 4(b) show a layout definition file and a data structure of a layout number definition table 330.

The structure of the content delivery terminal 100 will now be discussed in detail, referring to FIG. 2. FIG. 2 is a schematic showing the structure of the content delivery terminal 100.

Referring to FIG. 2, the content delivery terminal 100 includes a CPU 30 that performs arithmetic operation and controls the entire system based on a control program, a ROM 32 that stores beforehand a control program of the CPU 30 in a predetermined area thereof, a RAM 34 that stores data read from the ROM 32 or the like and calculation results required in the course of the arithmetic operation of the CPU 30, and an I/F 38 that interfaces with an external device for exchange of data. To exchange data, these components are mutually interconnected through a bus 39, as a signal line to transfer data.

The following elements are connected to the I/F 38 as external units: a user information registration data base 40 (data base hereinafter simply referred to as "DB") that registers user information, a content registration DB 42, that collects and stores digital contents supplied by the content providing terminals $S_1$–$S_n$, and a signal line connected to the Internet 199.

Referring to FIG. 3, the user information registration DB 40 stores a user profile table 300 in which the user information is registered. FIG. 3 shows a data structure of the user profile table 300.

The user profile table 300 registers a single or a plurality of records for each user, as shown in FIG. 3. Each record includes a field 302 that registers a user ID to identify a user, a field 304 that registers a destination address of a digital content, a field 306 that registers a category number, a field 308 that registers a keyword, a field 310 that registers a date of delivery, a field 312 that registers time of delivery, a field 314 that registers a layout number, a field 316 that registers a maximum number of pages, and a field 318 that registers a font size.

When a digital content that contains a keyword designated by a user is selected as data to be delivered, the field 308 registers that keyword. The keyword may be the one that seems to appear most frequently in the news of a category in which the user is interested. Referring to FIG. 3, a "PROCESSOR" is registered in a first row of the field 308, and an "OS" is registered in a second row of the field 308.

The field 310 registers a date of delivery on which the user desires the delivery of the digital content. For example, when the delivery of the digital content is desired everyday, "EVERYDAY" is designated. When the delivery of the digital content is desired on a weekday only, a "WEEKDAY" is designated. When the delivery of the digital content is desired on a weekend only, a "WEEKEND" is designated. Referring to FIG. 3, "EVERYDAY" is registered in a first row of the field 310, and a "WEEKDAY" is registered in a second row of the field 310.

The field 312 registers the time of delivery of the digital content on the delivery date designated by the user. As the time of delivery, one day may be divided into 24 hours from zero hour band to twenty-third hour band, and any time band may be designated. Referring to FIG. 3, a fifth hour band is registered in a first row of the field 312, and an eleventh hour band is registered in a second row in the field 312.

The field 314 registers the layout number that identifies the output layout of the digital content. The layout number identifies the output layout desired by the user. Referring to FIG. 3, layout number 2 is registered in a first row of the field 314, and layout number 5 is registered in a second row of the field 314. The layout number will be discussed in detail below.

The field 316 registers the maximum number of pages at the upper limit when the digital content is displayed or printed out. The maximun number of pages designates the maximum numbers of pages at the upper limit. Alternatively, the letter "u" may be designated to set no upper limit. Referring to FIG. 3, "2" pages are registered in a first row of the field 316, and the letter "u" is registered in a third row of the field 316.

The field 318 registers the size of a font when the digital content is displayed or printed out. Referring to FIG. 3, a "SMALL" font is registered in a first row of the field 318, and a "STANDARD" font is registered in a third row of the field 318.

Referring to FIGS. 4(a) and 4(b), the user information registration DB 40 stores a plurality of layout definition files form01–form06 defining the output layout of the digital contents, and a layout number definition table 330 that indicates the correspondence between the layout definition files form01–form06 and the layout numbers. FIGS. 4(a) and 4(b) show a data structure of the layout definition file and the layout number definition table 330.

Referring to FIG. 4(b), the layout number definition table 330 registers a single record for each layout number. Each record includes a field 332 that registers the layout number, and a field 334 that registers a file name of the layout definition file. As shown in FIG. 4(b), a first row record registers "1" as a layout number, and "form01" as a layout definition file name, and a second record registers "2" as a layout number and "form02" as a layout definition file name.

Referring to FIGS. 5(a) and 5(b), the content registration DB 42 stores a category number definition table 340 that shows the relationship between the digital contents supplied from the content providing terminals $S_1$–$S_n$, the main category, the subcategory, and the category number. FIGS. 5(a) and 5(b) show the digital contents and the data structure of the category number definition table 340.

As shown in FIG. 5(a), the digital contents supplied by the content providing terminals $S_1$–$S_n$ are tagged with the respective category numbers, and the content delivery terminal 100 classifies the digital contents using the category number by category, and registers the classified digital contents in the content registration DB 42. When registering, the content delivery terminal 100 references the category number definition table 340, and adds the category number, the main category, and the subcategory to the digital contents.

Referring to FIG. 5(b), the category number definition table 340 registers a single record in each of the main category and the subcategory. Each record includes a field 342 that registers a category number, a field 344 that registers a main category, and a field 346 that registers a subcategory. As shown in FIG. 5(b), a first row record registers "1102" as the category number, "WORLD NEWS" as the main category, and "U.S." as the subcategory, and a sixth row record registers "2010" as the category number, "SPORTS" as the main category, and "BASEBALL" as the subcategory.

The structure of the CPU 30 and the process executed by the CPU 30 will be discussed referring to FIG. 6 and FIG. 7.

Figure 6:
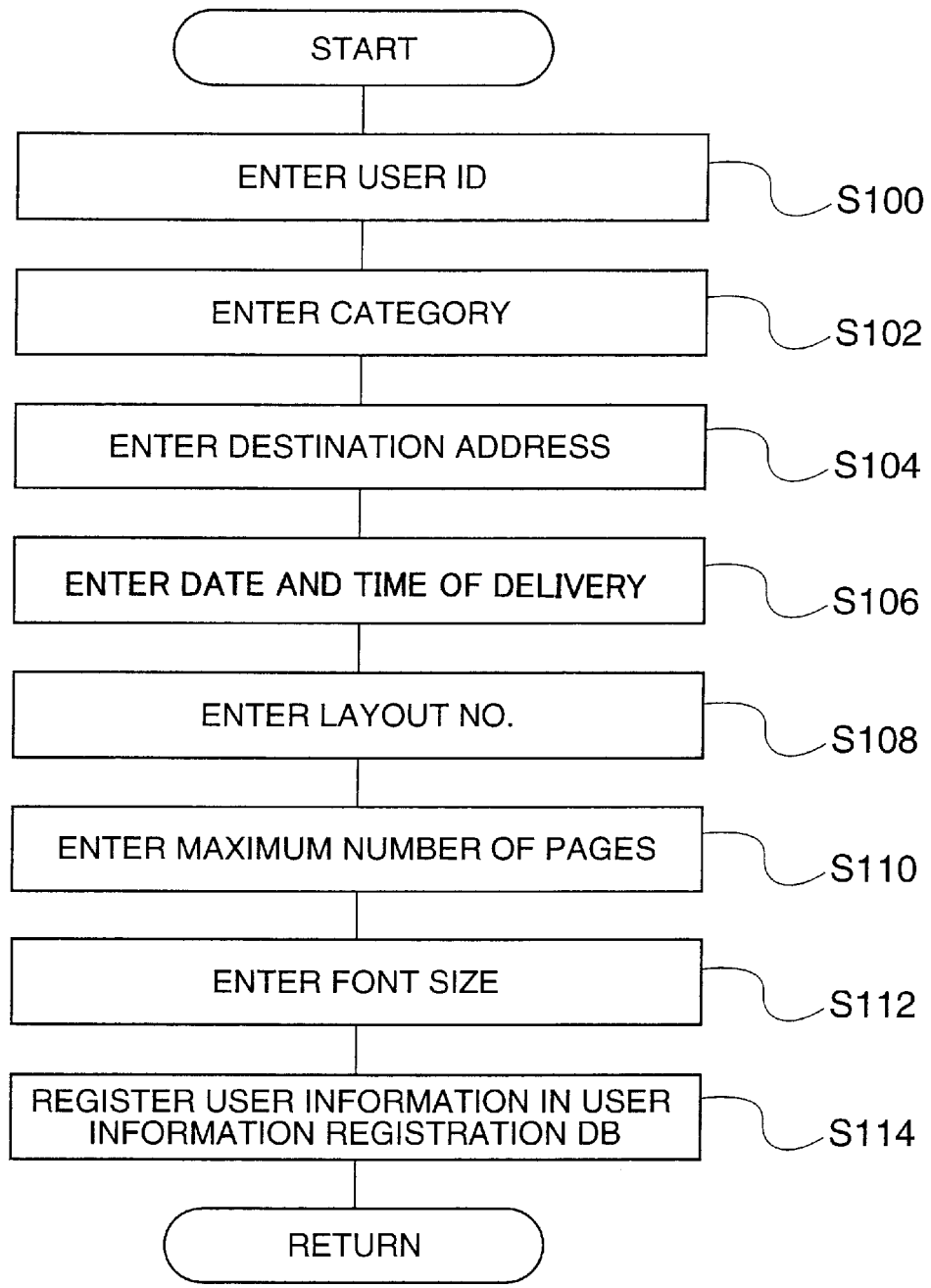
FIG. 6 is a flow diagram showing a user registration process.
Figure 7:
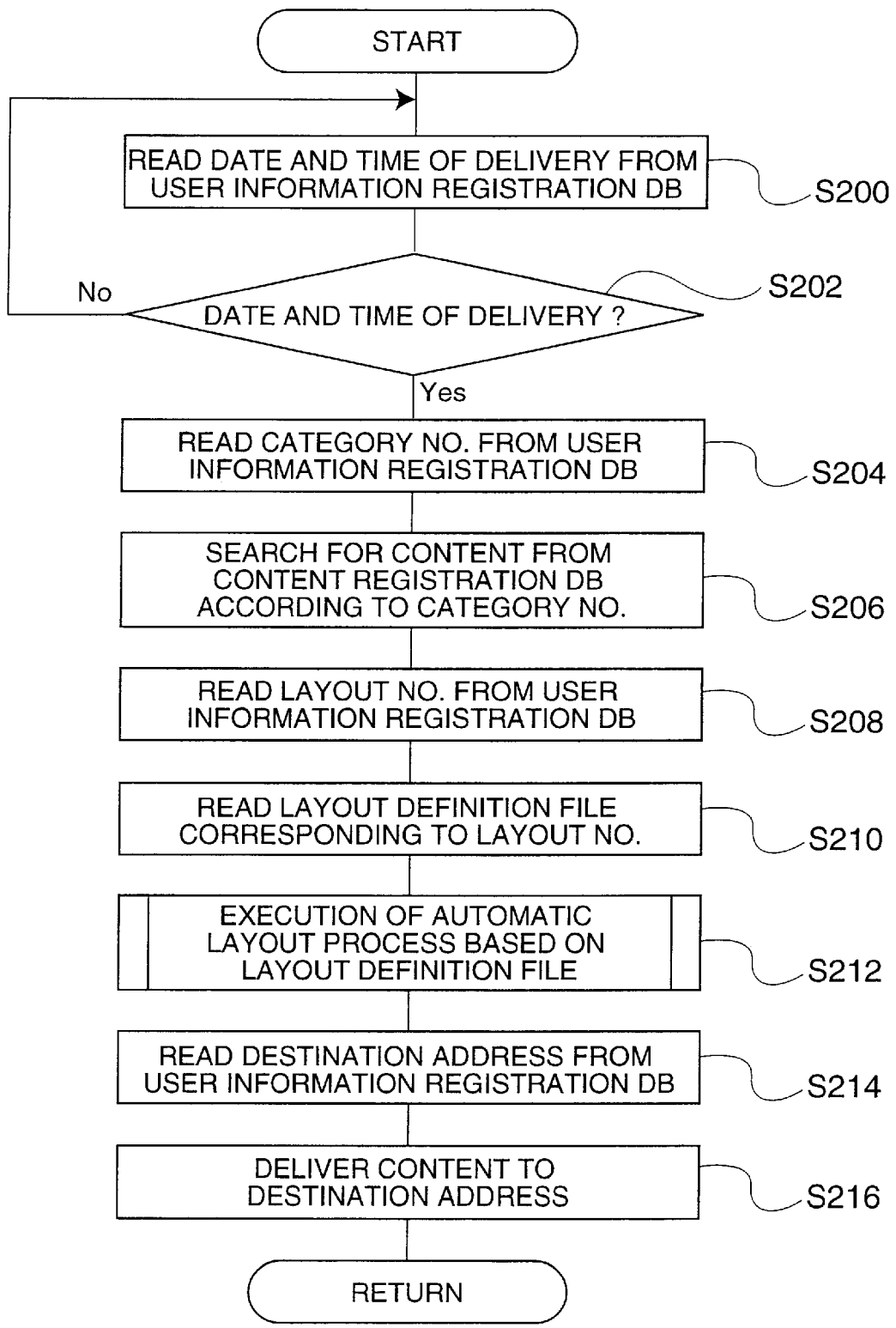
FIG. 7 is a flow diagram showing a content delivery process.

The CPU 30, formed of a micro processing unit (an MPU), starts a predetermined program stored in a predetermined area of the ROM 32, and executes a user registration and a content delivery process in a time sharing manner, as shown in FIG. 6 and FIG. 7.

Referring to FIG. 6, the user registration process will first be discussed in detail. FIG. 6 is a flow diagram showing the user registration process.

When the user has accessed the system, the user registration process requests the user to input the user information such as the user ID, and registers the input user information in the user profile table 300. When the CPU 30 starts, the process proceeds to step S100. Inputting in each of the following steps is performed in an interactive communication with the user.

In step S100, the user ID is input. In step S102, the main category and the subcategory are input. In step S104, the destination address is input, and in step S106, the date and time of delivery are input, and the process proceeds to step S108.

In step S108, the layout number is input, and in step S110, the maximum number of pages is input. In step S112, a font size is input. In step S114, the user information input in steps S100 through S112 is registered in the user profile table 300, and a series of steps have been completed, and the process returns.

The content delivery process will now be discussed in more detail referring to FIG. 7. FIG. 7 is a flow diagram showing the content delivery process.

The content delivery process delivers the digital content to the user terminal 200 by referencing the user profile table 300. Referring to FIG. 7, when the CPU 30 starts, the process proceeds to step S200. The process of the following steps is performed for each record of the user profile table 300. In practice, the process of each step is performed by the number of times equal to the number of records registered in the user profile table 300.

In step S200, the date and time of delivery are read from the user profile table 300. In step S202, the CPU 30 determines, from the read date and time of delivery, whether it is the date and time when the digital content must be delivered. When the CPU 30 determines that it is the date and time when the digital content must be delivered (Yes), the process proceeds to step S204, else (No) the process returns to step S200.

In step S204, the CPU 30 reads the category number from the user profile table 300, and proceeds to step S206. The CPU 30 searches for the digital content in the content registration DB 42 according to the read category number, finds the digital content having the category number equal to the read category number, and proceeds to step S208.

In step S208, the CPU 30 reads the layout number from the user profile table 300, and proceeds to step S210. Referencing the layout number definition table 330, the CPU 30 reads, from the user information registration DB 40, the layout definition file corresponding to the read layout number. In step S212, based on the read layout definition file, the CPU 30 performs an automatic layout process that produces the digital content by determining the output layout for the digital content searched in step S206. The process then proceeds to step S214.

In step S214, the CPU 30 reads the destination address from the user profile table 300, and proceeds to step S216. The CPU 30 delivers the produced digital content to the read destination address. After completing this series of steps, the CPU 30 returns.

The operation of the above embodiment will now be discussed, referring to FIG. 8 through FIG. 12.

The registration process to register information required to deliver the digital content will now be discussed.

When the user desires the delivery of a digital content, the user accesses the content delivery terminal 100 using the WWW browser on the user terminal 200, and inputs a user registration request.

Figure 8:
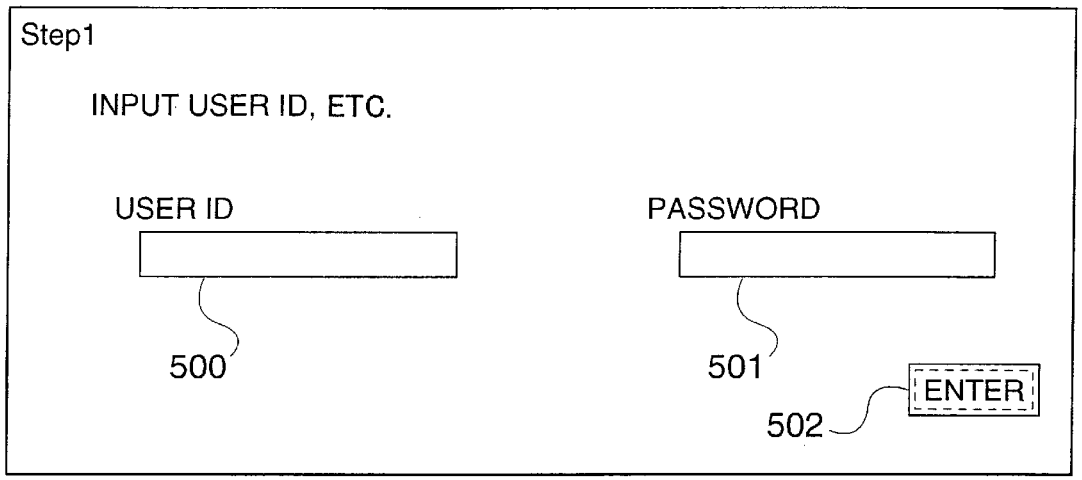
FIG. 8 shows a user ID entry screen.

When the user registration request is input, the user terminal 200 receives screen construction data to form a user ID input screen on which the user ID is input, and presents a screen shown in FIG. 8 based on the screen construction data. FIG. 8 shows the user ID entry screen.

Referring to FIG. 8, the user enters the user ID and the password. The user enters the user ID and the password by inputting numerals and characters in text boxes 500 and 501 using a keyboard, etc. When the input of the user ID and the password is complete, a button 502 labeling "ENTER" is clicked.

Figure 9:
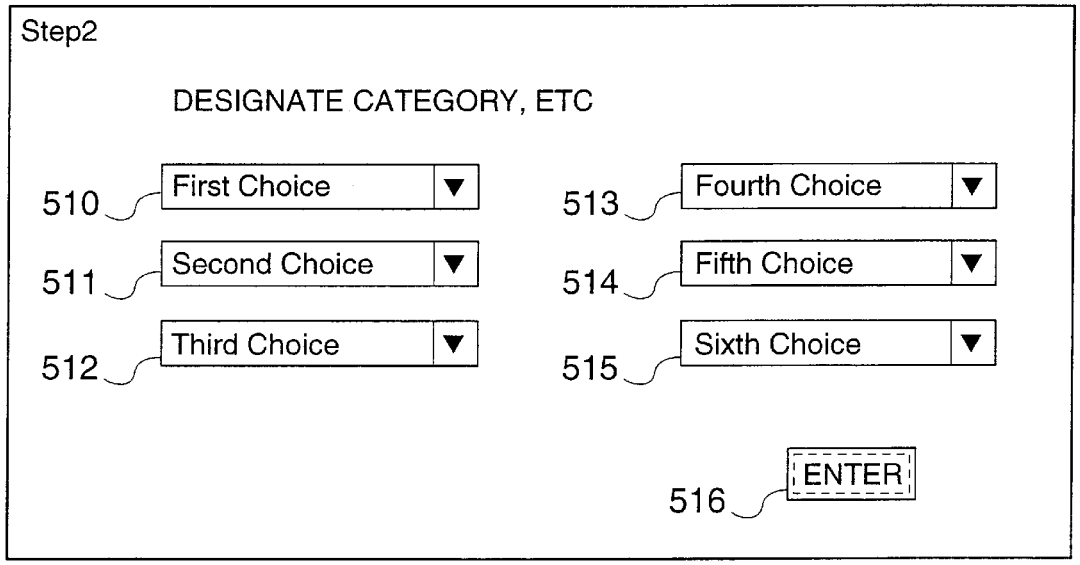
FIG. 9 shows a category designation screen.

When the input of the user ID and the password is complete, the user terminal 200 transmits the user ID, etc. to the content delivery terminal 100. In communication with the content delivery terminal 100, the user terminal 200 receives screen construction data of a category designate screen for designating a category of the digital content. Based on the screen construction data, the user terminal 200 presents a screen shown in FIG. 9. FIG. 9 shows the category designate screen.

Referring to FIG. 9, the user can designate up to six categories of digital contents the delivery of which is desired by the user. The designation of the category of the digital content may be performed by selecting a desired category from among combo boxes 510–515, respectively having categories listed therewithin. When the inputting of the category is complete, a button 516 "ENTER" is clicked.

When the designation of the category is complete, the user terminal 200 transmits the designation of the category to the content delivery terminal 100. In communication with the content delivery terminal 100, the user terminal 200 receives screen construction data of a destination address entry screen to enter the destination address, etc. for the digital content, and displays a screen shown in FIG. 10 based on the screen construction data. FIG. 10 shows the destination address entry screen.

Referring to FIG. 10, the user enters the destination address at which the user desires to receive the delivery, and the date and time of delivery desired by the user. The user enters the destination address in numerals and characters, etc. in a text box 520 using a keyboard, etc. The input of the data of delivery may be performed by selecting "EVERYDAY," "EVERY WEEK," "WEEKEND," and "WEEKDAY (Monday–Friday)," respectively at option buttons 530–533. The time of delivery is input by selecting a desired time band from among combo boxes 540 and 541 registering a list of time bands. When the input of these pieces of data is complete, a button 542 "ENTER" is clicked.

Figure 11:
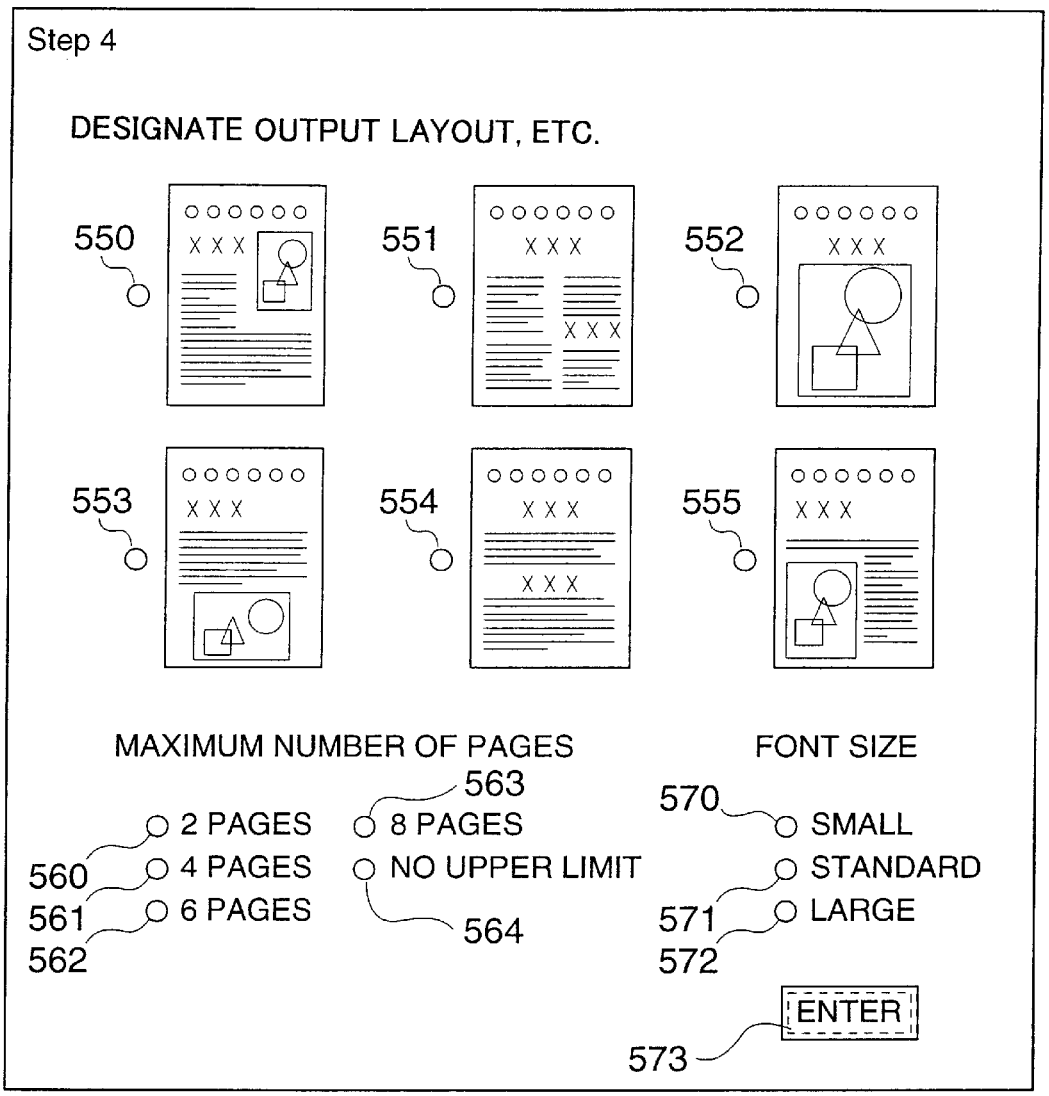
FIG. 11 shows an output layout designation screen.

When the input of the destination address, etc. is complete, the user terminal 200 transmits the destination address, etc. to the content delivery terminal 100. In communication with the content delivery terminal 100, the user terminal 200 receives screen construction data of an output layout designating screen to designate the output layout, etc. of the digital content, and displays a screen shown in FIG. 11 based on the screen construction data. FIG. 11 shows the output layout designating screen.

Referring to FIG. 11, the user designates the layout number, the maximum number of pages, and the font size. The layout number is designated by selecting one from six option buttons 550–555 corresponding to sample images laid out in accordance with the output layouts. The maximum number of pages is designated by selecting one of option buttons 560–564 respectively corresponding to the settings of "2 PAGES," "4 PAGES," "6 PAGES,", "8 PAGES," and "NO UPPER LIMIT." The font size is designated by selecting one from option buttons 570–572 respectively corresponding to the settings of "SMALL," "STANDARD," and "LARGE." When the designation of these settings is complete, a button 573 "ENTER" is clicked.

Figure 12:
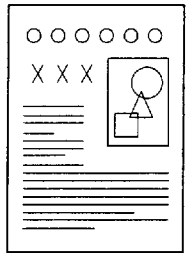
FIG. 12 is a registration content verification screen.

When the designation of the output layout, etc. is complete, the user terminal 200 transmits the designation of the output layout to the content delivery terminal 100. In communication with the content delivery terminal 100, the user terminal 200 receives screen construction data of a registration content verification screen to verify the registration content, and displays a screen shown in FIG. 12 based on the screen construction data. FIG. 12 shows a registration content verification screen.

Referring to FIG. 12, "SPORTS; GOLF; MARUYAMA," "U.S.; U.S. TOP NEWS; BUSH" are displayed as categories, "aaa@bbb.com" is displayed as the destination address, "EVERYDAY," and "5:00 A.M." are displayed as the date and time of delivery. A sample image laid out in the output layout is displayed, "4 PAGES" are displayed as the maximum number of pages, and "SMALL" is displayed as the font size. When the user finds no error in the content of the registration, a button 580 "START DELIVERY" is clicked.

When the verification of the registration content is complete, the user terminal 200 transmits the delivery start request to the content delivery terminal 100.

When the delivery start request is received, the content delivery terminal 100 registers, in the user profile table 300, the designation of the content received, and the designation of the user ID, etc. and the output layout, etc. in step S114. The designation of the content is registered as the content number referencing the category number definition table 340. The designation of the output layout is registered as the layout number referencing the layout number definition table 330.

The delivery of the digital content referencing the user profile table 300 will now be discussed.

The content delivery terminal 100 references the user profile table 300. When the content delivery terminal 100 determines that it is the day and time for delivery of the digital content, the content delivery terminal 100 reads the category number from the user profile table 300 in steps S204 and S206. The content delivery terminal 100 searches for the digital content in the content registration DB 42 based on the read category number, and retrieves a digital content having a category number equal to the read category number. In steps S208 through S212, the layout number is read from the user profile table 300. Referencing the layout number definition table 330, the content delivery terminal 100 reads the layout definition file corresponding to the read layout number from the user information registration DB 40. Based on the layout definition file, the output layout is determined for the retrieved digital content, and the digital content is thus produced in accordance with the output layout.

In steps S214 and S216, the destination address is read from the user profile table 300, and the produced digital content is delivered to the read destination address.

In this embodiment, the content delivery terminal 100 includes a user information registration DB 40 that stores a plurality of layout definition files. When the user information including the destination address and the selection of the output layout are input, the input user information and the selected layout definition file are associated with each other before being registered in the user information registration DB 40. The output layout of the digital content is determined based on the layout definition file in the user information registration DB 40. The digital content is then produced in accordance with the output layout. The produced digital content is delivered to the destination address in association with the layout definition file used to produce the digital content.

Since the digital content is thus output in the output layout relatively close to the user's satisfaction in this way, the digital content is output in an output layout that is easier for a user to view than in the conventional art.

In this embodiment, the content delivery terminal 100 includes the content registration DB 42 that stores a plurality of digital contents. The content delivery terminal 100 reads the content number and the layout definition file relative to the content number from the user information registration DB 40, selects the digital content from the content registration DB 42 based on the read content number, determines the output layout of the selected digital content based on the read layout definition file, and produces the output digital content.

Only the readable information that is relatively close to the user's satisfaction is laid out. This arrangement reduces the difficulty of viewing the information, which would be increased if undesired and unnecessary readable information was to be laid out together with the desired information in a mixed fashion. The readable information is thus output in an easy-to-view layout to the user.

In this embodiment, the content delivery terminal 100 delivers the produced digital content in accordance with the date and time of delivery specified by the layout definition file.

Since the digital content is thus delivered within the time band in which the user desires delivery, the system can provide a delivery service to the user's satisfaction.

In this embodiment, the digital content corresponds to the readable information, the layout definition file corresponds to the layout information, the content number corresponds to the content information, and the date and time of delivery correspond to the schedule information. The user information registration DB 40 corresponds to the layout information storage device, steps S100-S12 correspond to the input device, step S114 corresponds to the registering device, step S212 corresponds to the content production device, and step S216 corresponds to the content delivery device.

In the above-referenced embodiment, the process shown in the flow diagrams in FIG. 6 and FIG. 7 is performed by executing a control program stored beforehand in the ROM 32. The present invention is not limited to this. Before being executed, the process shown in the flow diagrams in FIG. 6 and FIG. 7 may be performed by reading, from a storage medium, a software program of the process into the RAM 34. The software program may be downloaded from a network.

The storage medium may be a semiconductor storage medium, such as a RAM, a ROM, etc, a magnetic storage medium, such as a FD, an HD, etc, an optical storage readable medium, such as a CD, a CDV, an LD, a DVD, etc., or a magnetooptical storage readable medium, such as an MO, etc. The storage medium is thus any computer readable storage medium that permits data to be read electronically, magnetically, or optically.

In the above embodiment, the readable information production system and the digital content delivery system of the present invention are implemented in a network system, such as the Internet 199. The present invention is not limited to this arrangement. Alternatively, the present invention may be applied to what is referred to as an "intranet" that performs the same communication as that of the Internet 199. The present invention is not limited to a network that performs the same communication method as that of the Internet 199, and may be applied to an ordinary network.

In the readable information production system and the digital content delivery system of the above embodiment of the present invention, the user terminal 200 delivers digital contents, such as news to the content delivery terminal 100, as shown in FIG. 1. The present invention is not limited to this arrangement, and may be applied to other system configuration without departing from the scope and spirit of the present invention.

As discussed above, in the readable information production system of this specification, the readable information is output in the output layout that is relatively close to the user's satisfaction, the readable information is output in an easy-to-view output layout to the user, compared with the conventional art.

In the readable information production system of the specification, only the readable information that is relatively close to the user's satisfaction is laid out. This arrangement reduces the difficulty of viewing information, which would be increased if undesired and unnecessary readable information were laid out together with the desired information in a mixed fashion. The readable information is thus output in an easy-to-view output layout to the user.

In the digital content delivery system of the specification, the digital content is thus output in the output layout that is relatively close to the user's satisfaction in this way, the digital content is thus output in an easier-to-view manner than in the conventional art.

In the digital content delivery system of the specification, only the digital content that is relatively close to the user's satisfaction is laid out. This arrangement reduces the difficulty of viewing information, which would be increased if undesired and unnecessary readable information were laid out together with the desired information in a mixed fashion. The digital content is thus output in an easy-to-view output layout to the user.

In the digital content delivery system of the specification, the digital content is thus delivered within the time band in which the user desires delivery, and the system can provide a delivery service to the user's satisfaction, compared with the conventional art.

What is claimed is:

1. A readable information production system for delivering readable information, comprising:

a layout information storage device that is remote from any of a plurality of user input terminals and readable information providing terminals that stores a plurality of pieces of layout information relating to an output layout of readable information, the readable information being produced by accessing user information including schedule information relating to a time band in which a user desires delivery and a selection of layout information, that was previously stored by a user by remotely inputting through a user input terminal for registration in the user information registration database of the layout information storage device, the user information registration database containing fields to store user preferences, the schedule information relating to a time band in which a user desires delivery, the selected layout information, and the user information that is associated with the layout information, determining an output layout of the readable information based on the layout information stored in the user information database in the layout information storage device, and delivering the readable information in the determined output layout in accordance with the schedule information corresponding to the layout information in the layout information storage device.

2. The readable information production system according to claim 1, further comprising a readable information storage device that stores a plurality of pieces of readable information, the user information including information relating to readable information desired by a user, and the readable information being produced by the readable information production system reading, from the layout information storage device, the information relating to the desired readable information and the layout information corresponding to the information relating to the desired readable information, selecting the readable information from the readable information storage device based on the read information relating to the desired readable information, and determining an output layout for the selected readable information based on the read layout information.

3. A digital content delivery system for delivering a digital content, comprising:

a layout information storage device that is remote from any of a plurality of user input terminals and readable information providing terminals that stores a plurality of pieces of layout information relating to an output layout of the digital content;

an input device that is remote from the layout information storage device and inputs user information containing a destination address of the digital content, a selection of the layout information, and schedule information relating to a time band in which a user desires delivery;

a registering device that stores, in the user information database of the layout information storage device, the user information and user schedule information input by the user via the remote input device and the layout information selected by the user via the remote input device with the user information being associated with the layout information stored in the user information database;

a content production device that produces the digital content by determining the output layout of the digital content based on the layout information stored in the user information database of the layout information storage device; and a content delivery device that delivers the digital content which is produced by the content production device in accordance with the scheduling information corresponding to the layout information and the destination address associated with the layout information stored in the user information database.

4. The digital content delivery system according to claim 3, further comprising a content storage device that stores a plurality of digital contents, the user information including content information relating to a digital content the delivery of which is desired by a user, and a digital content being produced by the content production device reading, from the layout information storage device, the content information and the layout information corresponding to the content information, selecting the digital content from the content storage device based on the read content information, and determining an output layout for the selected digital content, based on the read layout information.

5. A readable information production system for delivering readable information, comprising:

a layout information storage device that stores a plurality of pieces of layout information relating to an output layout of readable information, the readable information being produced by entering user information including schedule information relating to a time band in which a user desires delivery and a selection of layout information, registering, in the layout information storage device, the input user information and the selected layout information with the user information that is associated with the layout information, determining an output layout of the readable information based on the layout information in the layout information storage device, and delivering the readable information in accordance with the schedule information corresponding to the layout information in the layout information storage device.

6. A digital content delivery system for delivering a digital content, comprising:

a layout information storage device that stores a plurality of pieces of layout information relating to an output layout of the digital content;

an input device that inputs user information containing a destination address of the digital content, a selection of the layout information, and schedule information relating to a time band in which a user desires delivery;

a registering device that registers, in the layout information storage device, the user information input by the input device and the layout information selected by the input device with the user information being associated with the layout information;

a content production device that produces the digital content by determining the output layout of the digital content based on the layout information in the layout information storage device; and a content delivery device that delivers the digital content which is produced by the content production device in accordance with the scheduling information corresponding to the layout information and the destination address responsive to the layout information.

* * * * *